(12) United States Patent
Paduvalli et al.

(10) Patent No.: US 12,051,913 B2
(45) Date of Patent: Jul. 30, 2024

(54) SYSTEMS AND METHODS FOR WIRELESSLY CHARGING INTERNET OF THINGS DEVICES

(71) Applicant: Verizon Patent and Licensing Inc., Basking Ridge, NJ (US)

(72) Inventors: Vijaya Paduvalli, Livingston, NJ (US); Jin Yang, Orinda, CA (US); Greg Augustus Rusu, Somerset, NJ (US); Arda Aksu, Lafayette, CA (US); Krishna K. Bellamkonda, Flower Mound, TX (US); Laszlo Joseph Herczku, Metuchen, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 442 days.

(21) Appl. No.: 17/302,712

(22) Filed: May 11, 2021

(65) Prior Publication Data
US 2022/0368163 A1   Nov. 17, 2022

(51) Int. Cl.
| | |
|---|---|
| H02J 50/20 | (2016.01) |
| H02J 50/40 | (2016.01) |
| H02J 50/80 | (2016.01) |
| H04L 43/08 | (2022.01) |

(52) U.S. Cl.
CPC .............. *H02J 50/20* (2016.02); *H02J 50/40* (2016.02); *H02J 50/80* (2016.02); *H04L 43/08* (2013.01); *H02J 2310/22* (2020.01)

(58) Field of Classification Search
CPC ....................................................... H04L 43/08
See application file for complete search history.

(56) References Cited

U.S. PATENT DOCUMENTS

2017/0295146 A1*  10/2017  Le Buhan ........... H04L 63/0435
2022/0200854 A1*   6/2022  Kane .................. H04L 41/0816

* cited by examiner

*Primary Examiner* — Nabil H Syed
*Assistant Examiner* — Cal J Eustaquio (57) ABSTRACT

A device may receive device data identifying Internet of Things (IoT) devices and may receive network data identifying network traffic patterns associated with the IoT devices. The device may process the device data and the network data, with a machine learning model, to determine parameters for charging each of the IoT devices and may determine that a particular IoT device of the IoT devices requires charging based on particular parameters associated with the particular IoT device. The device may receive location data identifying a location of the particular IoT device and may cause, based on the location data, one or more chargers to wirelessly provide a radio frequency power beam to the particular IoT device based on the particular parameters.

20 Claims, 10 Drawing Sheets

SYSTEMS AND METHODS FOR WIRELESSLY CHARGING INTERNET OF THINGS DEVICES

BACKGROUND

The Internet of things (IoT) describes a network of physical objects (e.g., devices, things, and/or the like) that are embedded with sensors, software, and other technologies for the purpose of connecting and exchanging data with other devices and systems over a network, such as the Internet.

DETAILED DESCRIPTION OF PREFERRED EMBODIMENTS

The following detailed description of example implementations refers to the accompanying drawings. The same reference numbers in different drawings may identify the same or similar elements.

The quantity of IoT devices is increasing rapidly and such devices need to be periodically charged to maintain functionality. Current techniques for radio frequency wireless charging utilize low-powered wireless devices, which may be constrained due to power technologies, to charge IoT devices. Furthermore, low-powered wireless induction devices may only charge IoT devices within a predetermined distance (e.g., three feet) from the low-powered wireless devices.

Some implementations described herein provide a device (e.g., a radio access network (RAN) controller, a base station, and/or customer premises equipment) that enables wirelessly charging of IoT devices. For example, the device may receive device data identifying IoT devices and may receive network data identifying network traffic patterns associated with the IoT devices. The device may process the device data and the network data, with a machine learning model, to determine parameters for charging each of the IoT devices and may determine that a particular IoT device of the IoT devices requires charging based on particular parameters associated with the particular IoT device. The device may receive location data identifying a location of the particular IoT device and may cause, based on the location data, one or more chargers to wirelessly provide a radio frequency power beam to the particular IoT device based on the particular parameters.

In this way, the device may enable wireless charging of IoT devices. For example, the device may communicate with various network components about locations of the IoT devices and base stations and/or customer premises equipment (e.g., with chargers) and may coordinate among radio frequency (RF) spectrums used for communications and wireless charging of the IoT devices. The device may cause a charger to be turned on or off so that an RF power beam generated by the charger may be pointed toward a location of one of the IoT devices requiring charging with a proper RF strength and a proper RF spectrum.

FIGS. 1A-1F are diagrams of an example 100 associated with wirelessly charging IoT devices. As shown in FIGS. 1A-1F, example 100 includes base stations 105 associated with IoT devices 110 and a RAN controller 115. The base stations 105 may include one or more chargers for wireless charging (e.g., providing power to) the IoT devices 110. Alternatively, or additionally, one or more of the chargers may be provided as standalone devices, provided as a component in customer premises equipment associated with the IoT devices, and/or the like. Further details of the base stations 105, the IoT devices 110, and the RAN controller 115 are provided elsewhere herein. Although certain operations are shown in FIGS. 1A-1F as being performed by the RAN controller 115, in some implementations, the operations may be performed by the base station 105 and the RAN controller 115 together, by the base station 105 alone, and/or the like.

Figure 1A:
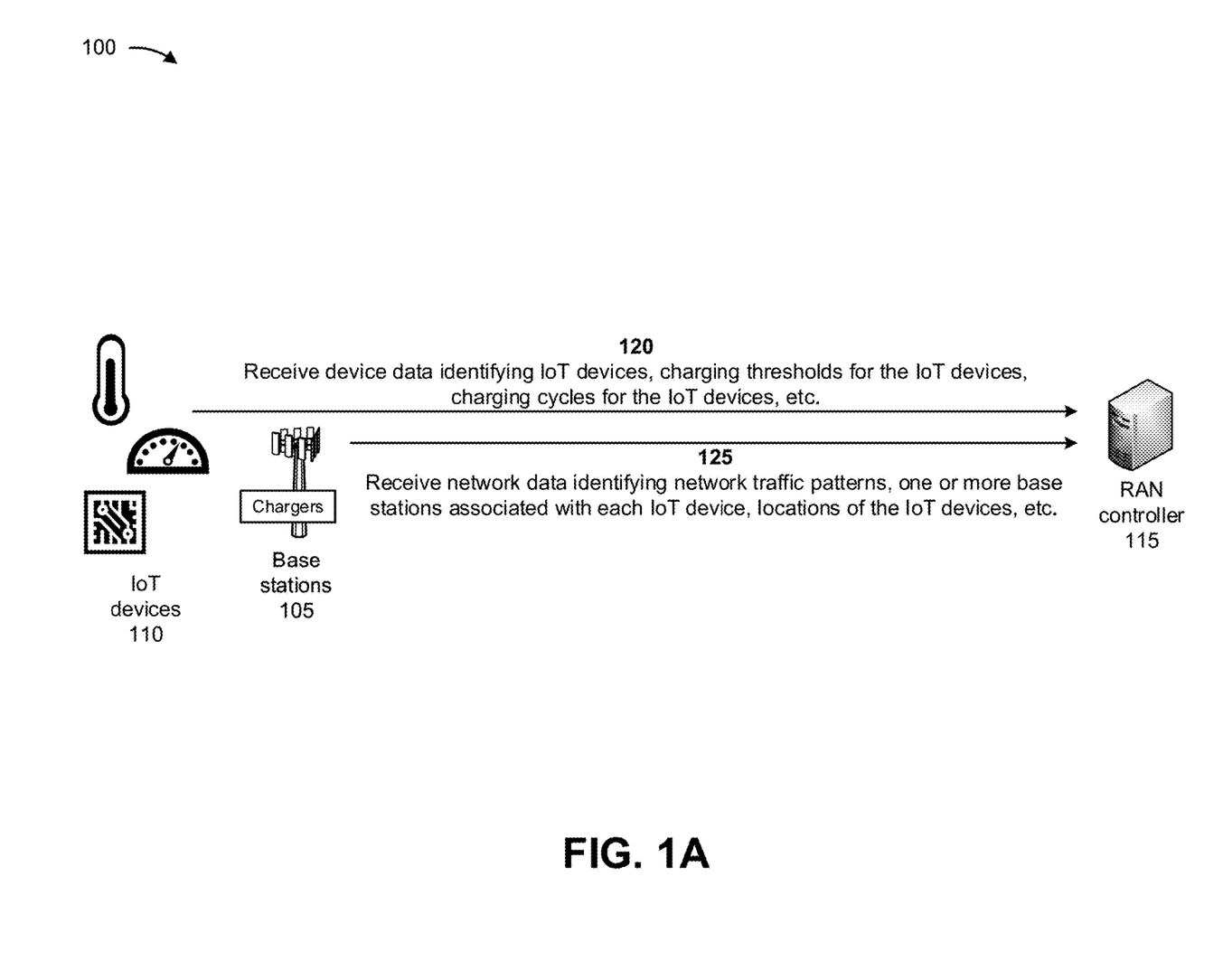
FIGS. 1A-1F are diagrams of an example associated with wirelessly charging IoT devices.

As shown in FIG. 1A, and by reference number 120, the RAN controller 115 may receive device data identifying the IoT devices 110, charging thresholds for the IoT devices 110, charging cycles for the IoT devices 110, and/or the like. The device data identifying the IoT devices 110 may include data identifying types of the IoT devices (e.g., sensors, monitors, smart lighting, and/or the like), serial numbers of the IoT devices 110, network addresses of the IoT devices 110, manufacturers of the IoT devices 110, and/or the like. The device data identifying the charging thresholds for the IoT devices 110 may include data identifying power thresholds at which the IoT devices 110 require charging. The device data identifying the charging cycles for the IoT devices 110 may include data identifying time periods (e.g., every eight hours, once a week, once a day, and/or the like) at which the IoT devices 110 require charging.

As further shown in FIG. 1A, and by reference number 125, the RAN controller 115 may receive network data identifying network traffic patterns associated with the base stations 105 and/or the IoT devices 110, one or more of the base stations 105 associated with each IoT device 110, locations of the IoT devices 110, and/or the like. The network data identifying the network traffic patterns may include data identifying bandwidth of the base stations 105 utilized by the IoT devices 110 to transmit and/or receive traffic, time periods associated with transmission or reception of the traffic by the IoT devices 110, RF spectrums associated with transmission or reception of the traffic by the IoT devices 110, and/or the like. The network data identifying the one or more base stations 105 associated with each IoT device 110 may include data identifying types of the base stations 105 (e.g., a fifth-generation (5G) base station, a fourth-generation (4G) base station, and/or the like), network addresses of the base stations 105, and/or the like.

Figure 1B:
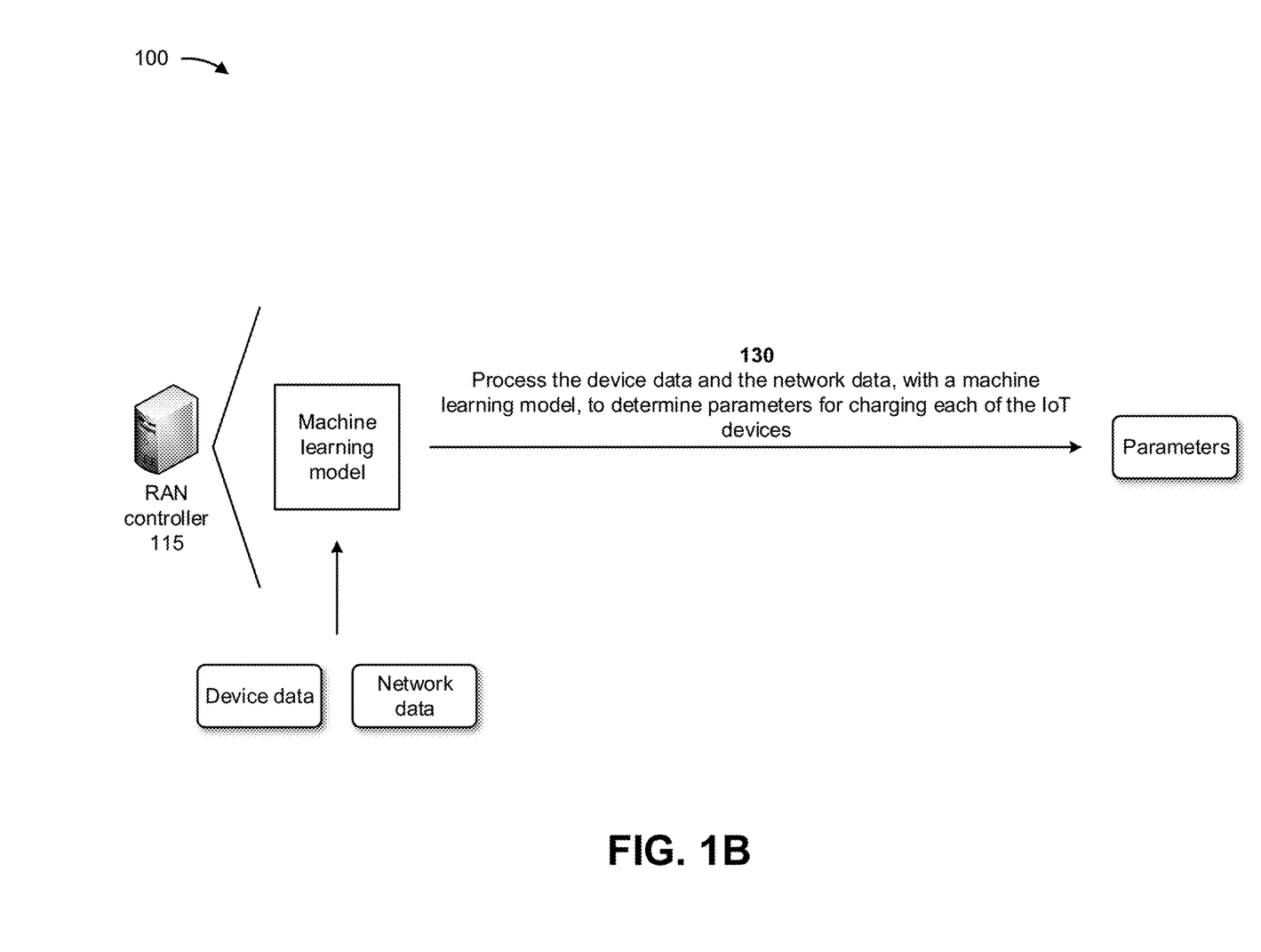

As shown in FIG. 1B, and by reference number 130, the RAN controller 115 may process the device data and the network data, with a machine learning model, to determine parameters for charging each of the IoT devices 110. The parameters for charging each of the IoT devices 110 may include parameters associated with charging thresholds for each of the IoT devices 110, charging cycles for each of the IoT devices 110, time cycles associated with charging each of the IoT devices 110, whether multiple chargers (e.g., beam reinforcement) may be utilized to charge each of the IoT devices 110, whether firmware updates may be provided to each of the IoT devices 110 from one or more base stations 105 in addition to power charges, whether each of the IoT devices 110 is capable of physically moving between different base stations 105, RF strengths associated with charging beams provided to each of the IoT devices 110, RF spectrums associated with charging beams provided to each of the IoT devices 110, and/or the like. Further details of the machine learning model are provided below in connection with FIG. 2.

Figure 1C:
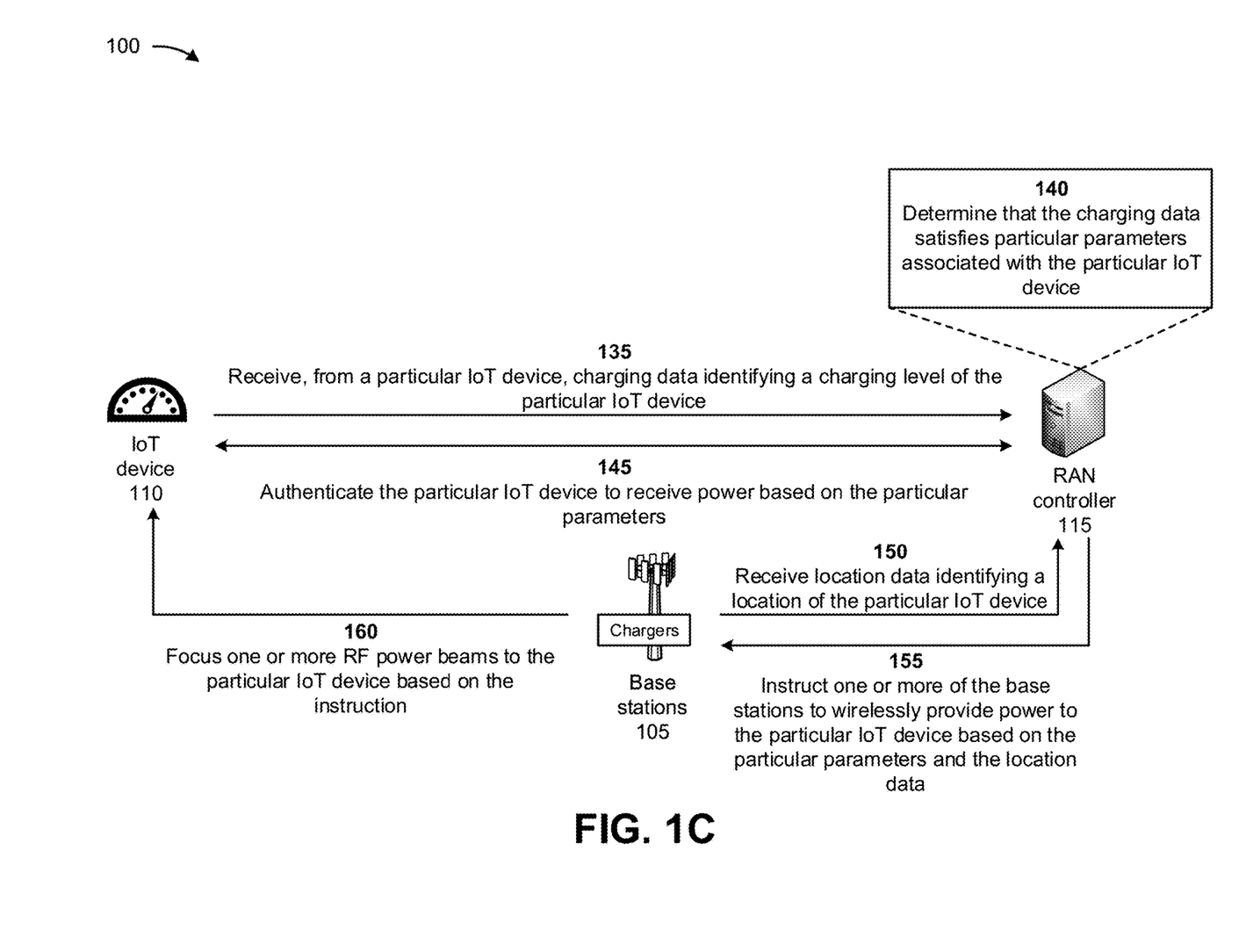

As shown in FIG. 1C, and by reference number 135, the RAN controller 115 may receive, from a particular IoT device 110, charging data identifying a charging level of the particular IoT device 110. The charging level of the particular IoT device 110 may include an indication of a current power level of the particular IoT device 110, an indication of a percentage of power utilized by the particular IoT device 110, an indication of a percentage of power remaining for the particular IoT device 110, and/or the like.

As further shown in FIG. 1C, and by reference number 140, the RAN controller 115 may determine that the charging data satisfies particular parameters associated with the particular IoT device 110. For example, the charging data may indicate a percentage of power remaining for the particular IoT device 110 (e.g., ten percent, twenty percent, and/or the like) and the particular parameters may include a parameter indicating that the particular IoT device 110 should be charged when the percentage of power remaining is less than thirty percent. In such an example, the RAN controller 115 may determine that the threshold percentage of power remaining for the particular IoT device 110 (e.g., less than thirty percent) is satisfied since the charging data indicates that the percentage of power remaining for the particular IoT device 110 is ten percent, twenty percent, and/or the like. In some implementations, the RAN controller 115 may determine that the charging data satisfies particular parameters associated with the particular IoT device 110 when the charging data indicates that the charging level of the particular IoT 110 device fails to satisfy a threshold power level.

As further shown in FIG. 1C, and by reference number 145, the RAN controller 115 may authenticate the particular IoT device 110 to receive power based on the particular parameters (e.g., parameters associated with the particular IoT device 110). For example, the particular parameters may include a parameter identifying the particular IoT device 110 as being eligible to receive power from one or more chargers associated with one or more of the base stations 105. In such an example, the RAN controller 115 may authenticate the particular IoT device 110 to receive the power from the one or more chargers associated with the one or more base stations 105. Alternatively, the particular parameters may fail to include the parameter identifying the particular IoT device 110 as being eligible to receive power from the one or more chargers associated with the one or more base stations 105. In such an example, the RAN controller 115 may not authenticate the particular IoT device 110 to receive the power from the one or more chargers associated with the one or more base stations 105.

Assuming that the particular IoT device 110 is authenticated to receive power based on the particular parameters, and as further shown by reference number 150 in FIG. 1C, the RAN controller 115 may receive location data identifying a geographical location of the particular IoT device 110. The RAN controller 115 may utilize the location data to identify one or more of the base stations 105 that are geographically closest to the geographical location of the particular IoT device 110. In this way, the RAN controller 115 may ensure that the particular IoT device 110 will receive power from one or more chargers of the identified one or more of the base stations 105.

As further shown in FIG. 1C, and by reference number 155, the RAN controller 115 may instruct one or more of the base stations 105 (e.g., the one or more base stations 105 identified based on the location data) to wirelessly provide power to the particular IoT device 110 based on the particular parameters and the location data. For example, the RAN controller 115 may provide, to the one or more base stations 105, a command or an instruction to wirelessly provide an RF power beam to the particular IoT device 110 (e.g., identified by the location data) so that the particular IoT device 110 may be wirelessly charged by the RF power beam generated by the charger of the one or more base stations 105. The one or more base stations 105 may receive the command or the instruction from the RAN controller 115. The particular IoT device 110 may receive the RF power beam and may convert the RF power beam to power for charging the particular IoT device 110.

As further shown in FIG. 1C, and by reference number 160, the one or more base stations 105 (e.g., the chargers) may focus one or more RF power beams to the particular IoT device 110 based on the command or the instruction from the RAN controller 115 and based on the location data of the particular IoT device 110. In some implementations, the chargers of the one or more base stations 105 provide one or more RF power beams, with a particular RF strength and a particular RF spectrum, to the particular IoT device 110. The particular RF strength and the particular RF spectrum may ensure that the RF power beams do not interfere with RF communication beams generated by one or more of the base stations 105. The one or more base stations 105 may provide the power to the particular IoT device 110 for a time period, until the particular IoT device 110 is fully charged, and/or the like.

In some implementations, the RAN controller 115 may receive an indication that the charging level of the particular IoT device 110 satisfies a threshold level indicating that the particular IoT device 110 is fully charged, almost fully charged, and/or the like. The RAN controller 115 may cause the one or more base stations 105 to cease providing the power to the particular IoT device 110 based on the indication. For example, the RAN controller 115 may provide, to the one or more base stations 105, a command or an instruction to cease providing the power to the particular IoT device 110. The one or more base stations 105 may cease providing the power to the particular IoT device 110 based on the command or the instruction.

In some implementations, the RAN controller 115 may cause firmware data (e.g., firmware updates) to be provided to one or more of the IoT devices 110. For example, the RAN controller 115 may receive firmware data identifying a firmware update to be provided to the particular IoT device 110. The RAN controller 115 may determine that the firmware data satisfies the particular parameters associated with the particular IoT device 110 in a manner similar to the manner described above in connection with reference number 140. The RAN controller 115 may cause the one or more base stations 105 to wirelessly provide the firmware update to the particular IoT device 110 based on the particular parameters. For example, the RAN controller 115 may instruct one or more of the base stations 105 (e.g., the one or more base stations 105 identified based on the location data) to wirelessly provide the firmware update to the particular IoT device 110 based on the particular parameters and the location data. The wireless signal associated with the firmware update may not interfere with the RF power beams utilized to charge the IoT device 110. Thus, the wireless signal associated with the firmware update may be provided simultaneously while the IoT device 110 is charging, before or after the IoT device 110 is charged, and/or the like.

Figure 1D:
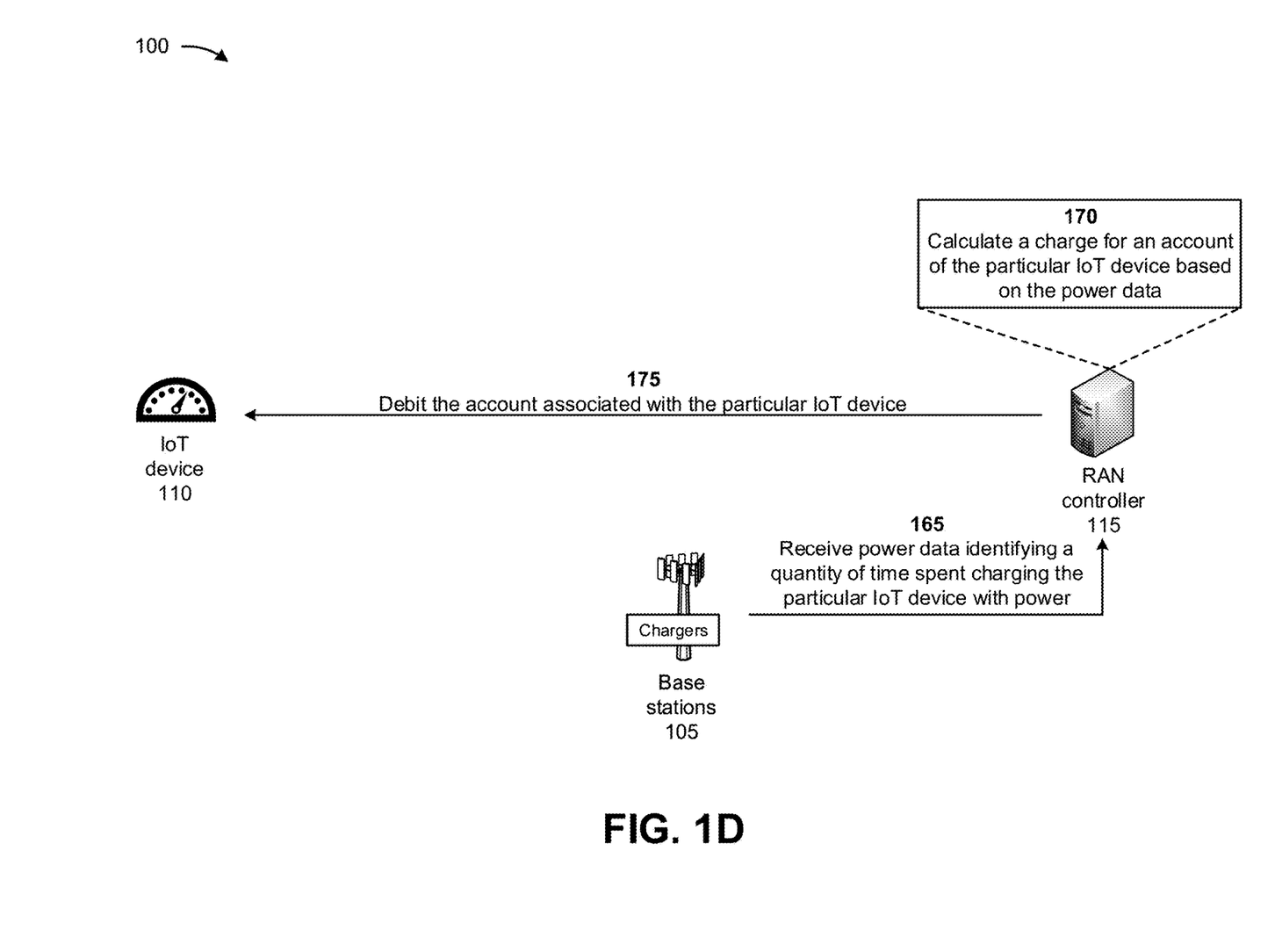

As shown in FIG. 1D, and by reference number 165, the RAN controller 115 may receive, from the one or more base stations 105, power data identifying a quantity of time spent charging the particular IoT device 110 with power. For example, if the one or more base stations 105 provide power to the particular IoT device 110 for one hour, the power data may indicate that one hour was spent charging the particular IoT device 110 with power. Alternatively, or additionally, the power data may identify a quantity of power provided by the one or more base stations 105 to the particular IoT device 110.

As further shown in FIG. 1D, and by reference number 170, the RAN controller 115 may calculate a charge (i.e., debit or credit) for a particular account associated with the particular IoT device 110 based on the power data (e.g., the quantity of time and/or the quantity of power). For example, the RAN controller 115 may multiply the power data by a cost (e.g., per quantity of time or per quantity of power) to determine a charge (e.g., a fee) for the particular IoT device 110.

As further shown in FIG. 1D, and by reference number 175, the RAN controller 115 may debit the account associated with the particular IoT device 110 for payment. For example, the RAN controller 115 may debit the account every time the particular IoT device 110 is charged, may debit the account based on multiple times that the particular IoT device 110 is charged, may debit the account for multiple IoT devices 110 over a time period, and/or the like.

Figure 1E:
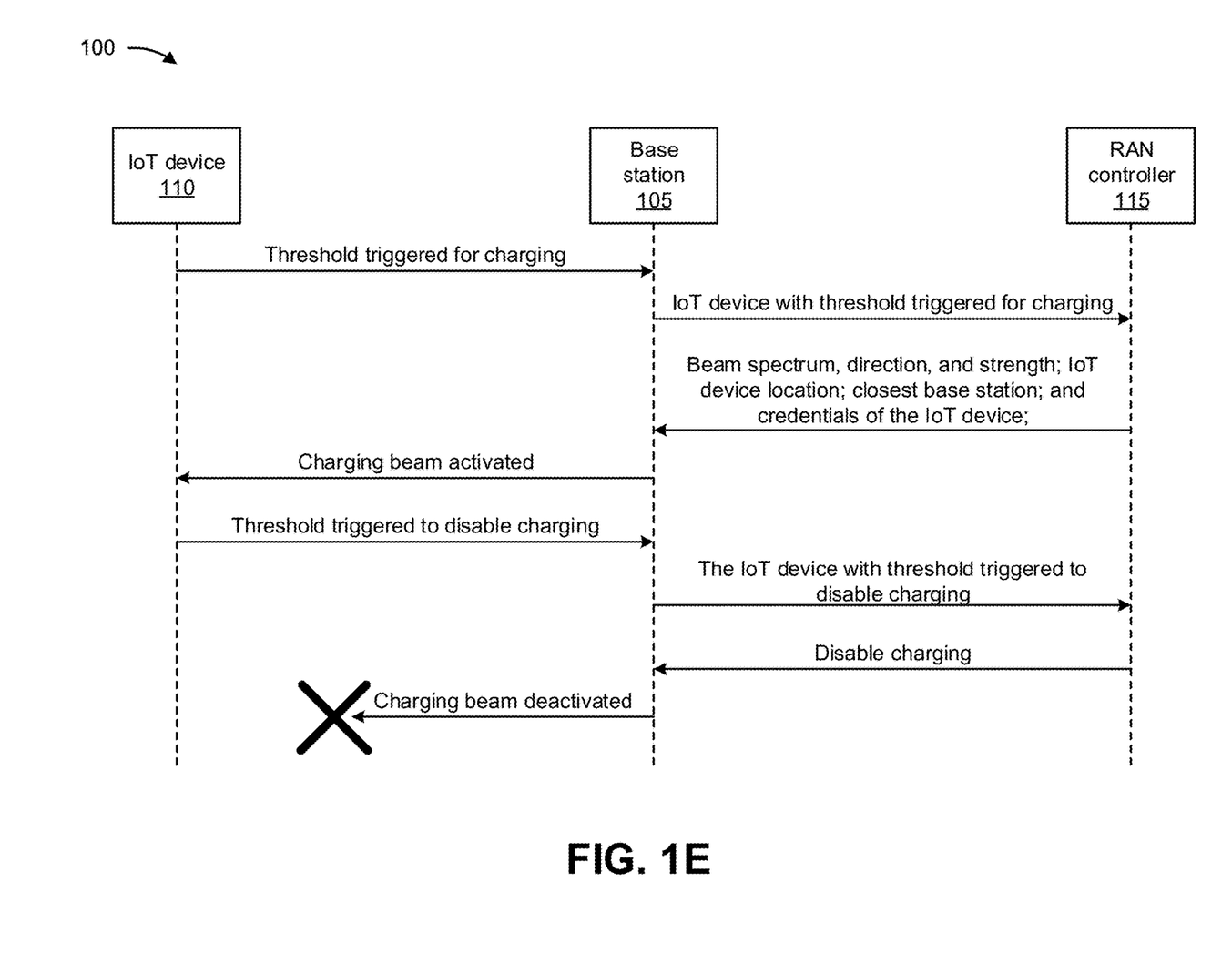

FIG. 1E depicts a call flow of interactions between the base station 105, the IoT device 110, and the RAN controller 115. As shown, when the IoT device 110 needs to be charged and satisfies a threshold for charging, the IoT device 110 may provide, to the base station 105, a message indicating that the threshold for charging has been triggered. The base station 105 may provide the message to the RAN controller 115 along with information identifying the IoT device 110. The RAN controller 115 may determine a location of the IoT device 110 based on the information identifying the IoT device 110 and may identify the base station 105 as being a closest base station to the IoT device 110. The RAN controller 115 may determine a charging beam spectrum, direction, and strength based on identifying the base station 105.

As further shown in FIG. 1E, the RAN controller 115 may provide, to the base station 105, information identifying the charging beam spectrum, direction, beam width, and strength; the location of the IoT device 110; and credentials of the IoT device 110. The base station 105 may receive the information from the RAN controller 115 and may activate the charging beam (e.g., with the charging beam spectrum, direction, and strength) based on the information. When the IoT device 110 is charged and satisfies a threshold to disable charging, the IoT device 110 may provide, to the base station 105, another message indicating that the threshold to disable charging has been triggered. The base station 105 may provide the other message to the RAN controller 115 along with information identifying the IoT device 110. The RAN controller 115 may provide, to the base station 105 and based on the other message, information instructing the base station 105 to disable charging the IoT device 110. The base station 105 may deactivate the charging beam based on the information instructing the base station 105 to disable charging the IoT device 110.

Figure 1F:
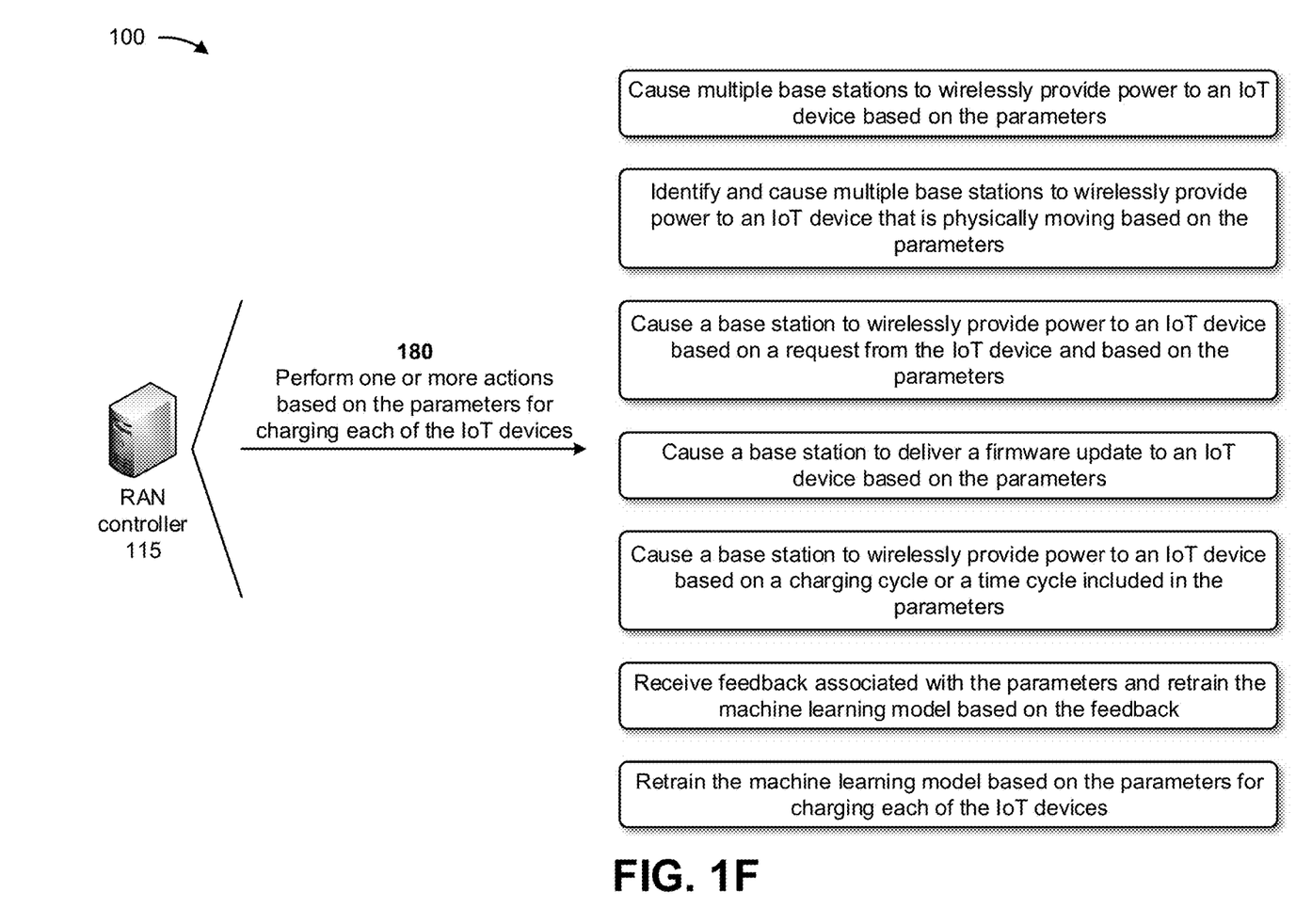

As shown in FIG. 1F, and by reference number 180, RAN controller 115 performs one or more actions based on the parameters for charging each of IoT devices 110. In some implementations, the one or more actions include the RAN controller 115 causing multiple base stations 105 to wirelessly provide the power to the particular IoT device 110 based on the parameters. For example, if the multiple base stations (e.g., and multiple chargers) are located geographically near the particular IoT device 110, then the multiple charging beams may be utilized to charge the particular IoT device 110 more quickly (e.g., via power beam reinforcement).

In some implementations, the one or more actions include the RAN controller 115 identifying multiple base stations 105 when the particular IoT device 110 is physically moving and causing the multiple base stations 105 to wirelessly provide the power to the particular IoT device 110. For example, when the particular IoT device is physically moving, the RAN controller 115 may identify which base stations 105 are associated with the movement of the particular IoT device 110. The RAN controller 115 may then cause the identified base stations 105 to wirelessly provide the power to the particular IoT device 110. In this way, the RAN controller 115 may conserve computing resources, networking resources, transportation resources, and other resources that would have otherwise been consumed by selecting base stations 105 that are not associated with the movement of the particular IoT device 110 and are thus unable to charge the particular IoT device 110.

In some implementations, the one or more actions include the RAN controller 115 causing the one or more base stations 105 to wirelessly provide the power to the particular IoT device 110 based on a request from the particular IoT device 110 and based on the parameters. For example, rather than monitoring a power state of the particular IoT device 110, the particular IoT device 110 may provide a request for charging to the RAN controller 115. The RAN controller may cause the one or more base stations 105 to wirelessly provide the power to the particular IoT device 110 based on the request. In this way, the RAN controller 115 may conserve computing resources, networking resources, transportation resources, and other resources that would have otherwise been consumed by continuously monitoring the power state of the particular IoT device 110.

In some implementations, the one or more actions include the RAN controller 115 causing the one or more base stations 105 to deliver a firmware update to the particular IoT device 110 based on the parameters. For example, the RAN controller 115 may receive firmware data identifying a firmware update to be provided to the particular IoT device 110. The RAN controller 115 may determine that the firmware data satisfies the parameters associated with the particular IoT device 110 and may cause the one or more base stations 105 to provide the firmware update to the particular IoT device 110 based on the parameters. In this way, the RAN controller 115 may conserve computing resources, networking resources, transportation resources, and other resources that would have otherwise been consumed by determining when the particular IoT device 110 needs to be provided the firmware update, managing a firmware update schedule for updating the particular IoT device 110, and/or the like.

In some implementations, the one or more actions include the RAN controller 115 causing the one or more base stations 105 to wirelessly provide the power to the particular IoT device 110 based on a charging cycle or a time cycle included in the parameters. For example, rather than monitoring a power state of the particular IoT device 110, the RAN controller 115 may periodically cause the one or more base stations 105 to wirelessly provide power to the particular IoT device 110 based on the charging cycle or the time cycle. In this way, the RAN controller 115 may conserve computing resources, networking resources, transportation resources, and other resources that would have otherwise been consumed by continuously monitoring the power state of the particular IoT device 110.

In some implementations, the one or more actions include the RAN controller 115 receiving feedback associated with the parameters and retraining the machine learning model based on the feedback. The RAN controller 115 may utilize the feedback as additional training data for retraining the machine learning model, thereby increasing the quantity of training data available for training the machine learning model. Accordingly, the RAN controller 115 may conserve computing resources associated with identifying, obtaining, and/or generating historical data for training the machine learning model relative to other systems for identifying, obtaining, and/or generating historical data for training machine learning models.

In some implementations, the one or more actions include the RAN controller 115 retraining the machine learning model based on the parameters for charging each of IoT devices 110. The RAN controller 115 may utilize the parameters for charging each of the IoT devices 110 as additional training data for retraining the machine learning model, thereby increasing the quantity of training data available for training the machine learning model. Accordingly, the RAN controller 115 may conserve computing resources associated with identifying, obtaining, and/or generating historical data for training the machine learning model relative to other systems for identifying, obtaining, and/or generating historical data for training machine learning models.

In this way, the RAN controller 115 may wirelessly charge the IoT devices 110. For example, the RAN controller 115 may communicate with various network components about locations of the IoT devices 110 and the base stations 105 (e.g., and the chargers) and may coordinate among RF spectrums used for communications and wireless charging of the IoT devices 110. The RAN controller 115 may cause a charger to be turned on or off and pointed toward a location of one of the IoT devices 110 requiring charging with proper RF strength and proper RF spectrum. Thus, the RAN controller 115 may conserve computing resources, networking resources, transportation resources, and other resources that would have otherwise been consumed by traveling to within the predetermined distances of the IoT devices 110, causing the low-powered wireless devices to charge the IoT devices 110, determining when the IoT devices 110 need to be charged, managing a charging schedule for charging the IoT devices 110, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
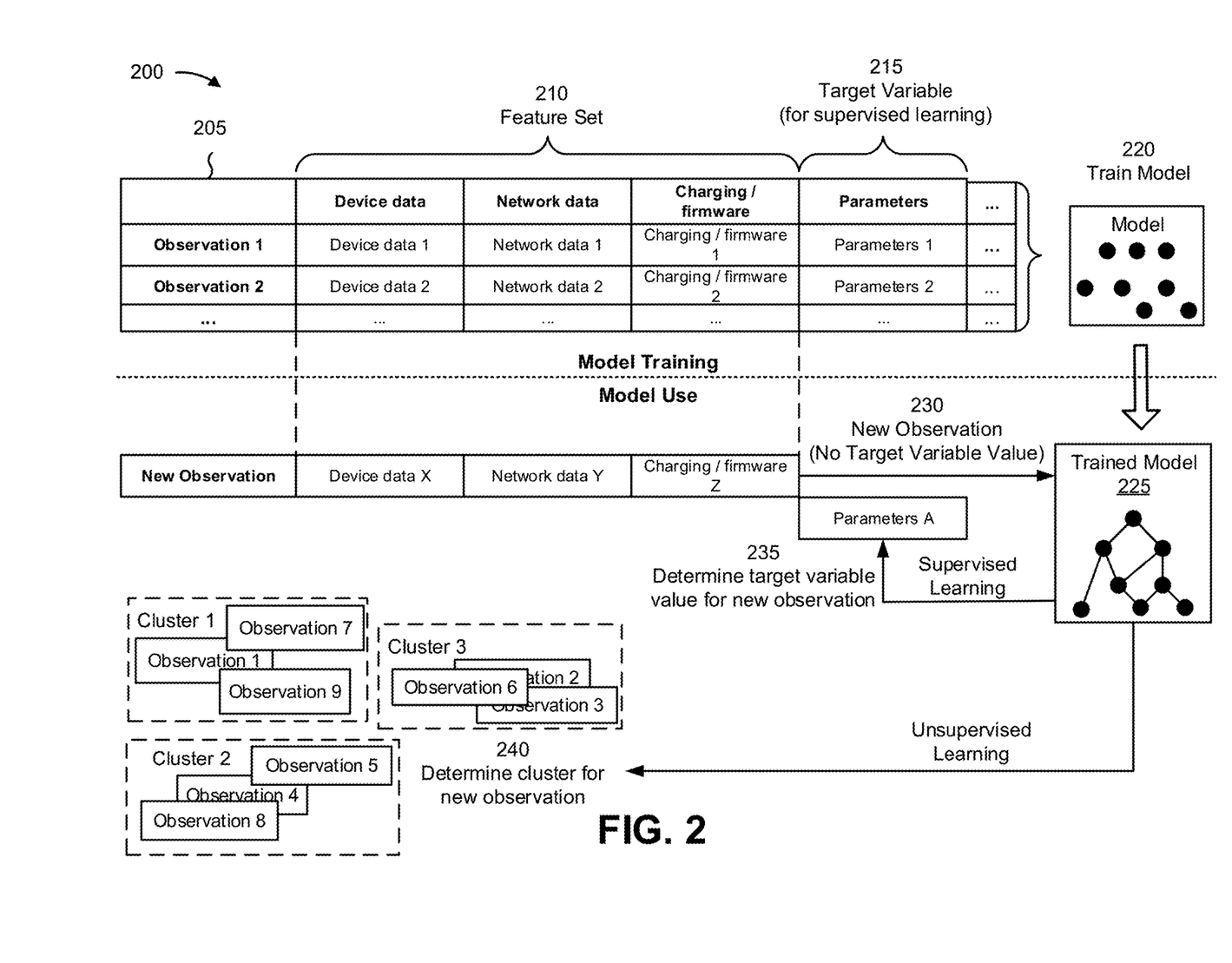
FIG. 2 is a diagram illustrating an example of training and using a machine learning model in connection with wirelessly charging IoT devices.

FIG. 2 is a diagram illustrating an example 200 of training and using a machine learning model in connection with wirelessly charging IoT devices 110. The machine learning model training and usage described herein may be performed using a machine learning system. The machine learning system may include or may be included in a computing device, a server, a cloud computing environment, and/or the like, such as RAN controller 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from RAN controller 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from RAN controller 115. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of device data, a second feature of network data, a third feature of charging/firmware, and so on. As shown, for a first observation, the first feature may have a value of device data 1, the second feature may have a value of network data 1, the third feature may have a value of charging/firmware 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is parameters, which has a value of parameters 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of device data X, a second feature of network data Y, a third feature of charging/firmware Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of parameters A for the target variable of the parameters for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a device data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a network data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to wirelessly charge IoT devices 110. The machine learning system enables recognition and/or identification of tens, hundreds, thousands, or millions of features and/or feature values for tens, hundreds, thousands, or millions of observations, thereby increasing accuracy and consistency and reducing delay associated with wirelessly charging IoT devices 110 relative to requiring computing resources to be allocated for tens, hundreds, or thousands of operators to manually wirelessly charge IoT devices 110.

As indicated above, FIG. 2 is provided as an example. Other examples may differ from what is described in connection with FIG. 2.

Figure 3:
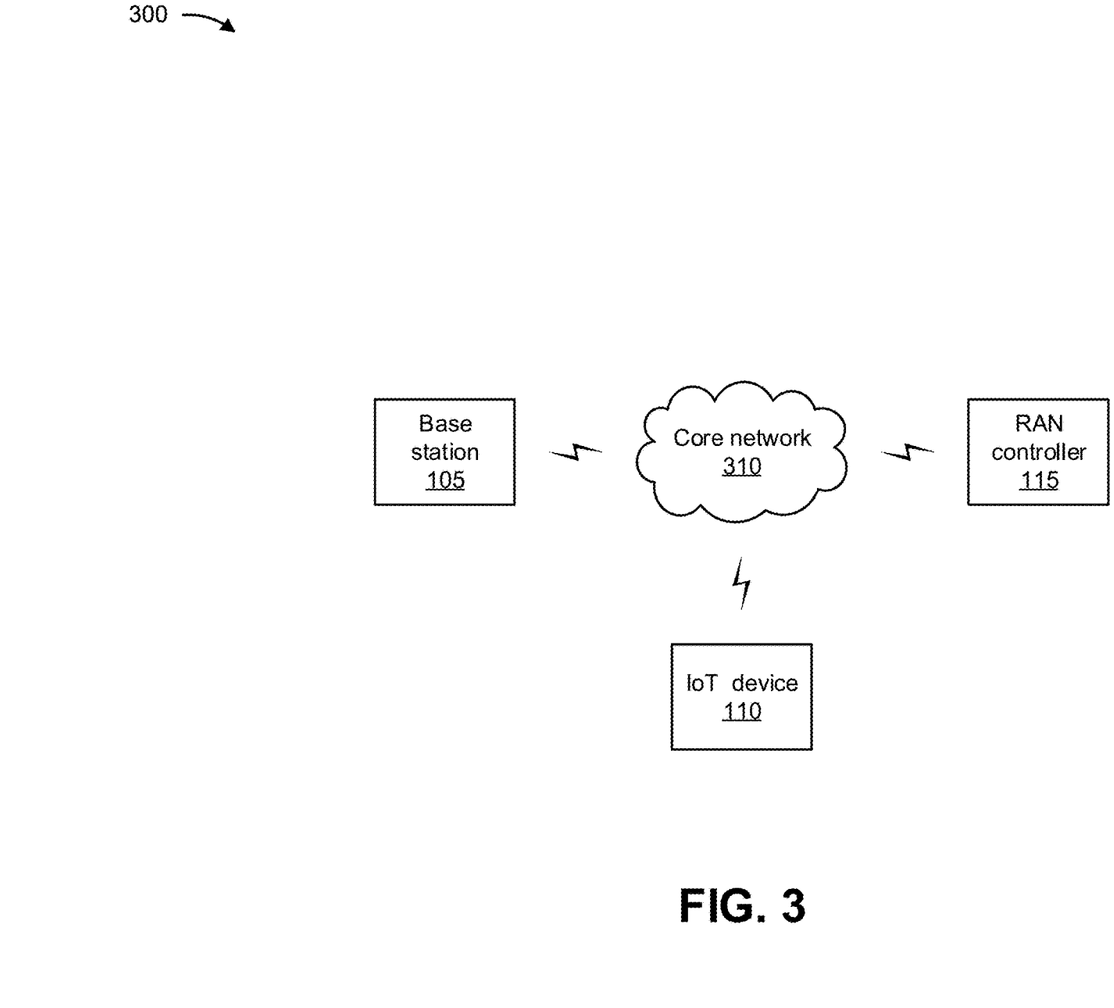
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include base station 105, IoT device 110, RAN controller 115, and/or a core network 310. Devices and/or elements of environment 300 may interconnect via wired connections and/or wireless connections.

Base station 105 includes one or more devices capable of transferring traffic, such as audio, video, text, and/or other traffic, destined for and/or received from IoT device 110. For example, base station 105 may include an eNodeB (eNB) associated with a long term evolution (LTE) network that receives traffic from and/or sends traffic to a core network, a gNodeB (gNB) associated with a RAN of a fifth generation (5G) network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication.

IoT device 110 includes one or more devices capable of receiving, generating, storing, processing, and/or providing information, as described elsewhere herein. IoT device 110 may include a communication device. For example, IoT device 110 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), or a similar type of device.

RAN controller 115 includes one or more devices capable of receiving, generating, storing, processing, providing, and/or routing information, as described elsewhere herein. RAN controller 115 may include a communication device and/or a computing device. For example, RAN controller 115 may include a device, such as an application device, a client device, a web device, a database device, a host device, a proxy device, a virtual device (e.g., executing on computing hardware), or a device in a cloud computing system. In some implementations, RAN controller 115 includes computing hardware used in a cloud computing environment.

Core network 310 may include a core network or a RAN that includes one or more base stations 105 that take the form of eNBs, gNBs, among other examples, via which a user device (e.g., a mobile phone, a laptop computer, a tablet computer, a desktop computer, among other examples) communicates with a core network. Core network 310 may include one or more wired and/or wireless networks. For example, core network 310 may include a cellular network (e.g., a 5G network, an LTE network, a third generation (3G) network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, among other examples, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
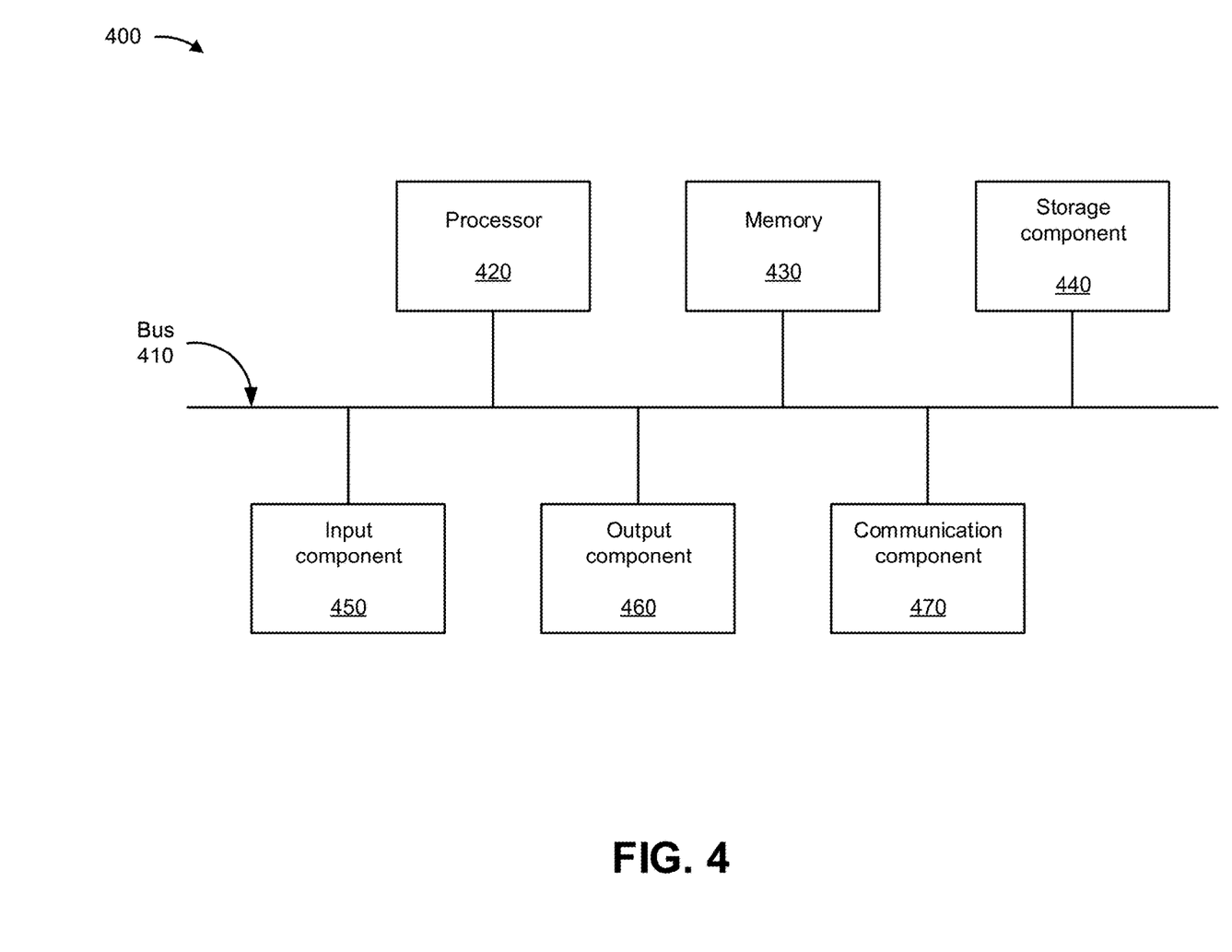
FIG. 4 is a diagram of example components of one or more devices of FIG. 3.

FIG. 4 is a diagram of example components of one or more devices of FIG. 3. The one or more devices may include a device 400, which may correspond to base station 105, IoT device 110, and/or RAN controller 115. In some implementations, base station 105, IoT device 110, and/or RAN controller 115 may include one or more devices 400 and/or one or more components of the device 400. As shown in FIG. 4, the device 400 may include a bus 410, a processor 420, a memory 430, a storage component 440, an input component 450, an output component 460, and a communication component 470.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory). The storage component 440 stores information and/or software related to the operation of device 400. For example, the storage component 440 may include a hard disk drive, a magnetic disk drive, an optical disk drive, a solid-state disk drive, a compact disc, a digital versatile disc, and/or another type of non-transitory computer-readable medium. The input component 450 enables device 400 to receive input, such as user input and/or sensed inputs. For example, the input component 450 may include a touch screen, a keyboard, a keypad, a mouse, a button, a microphone, a switch, a sensor, a global positioning system component, an accelerometer, a gyroscope, and/or an actuator. The output component 460 enables device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, and/or an antenna.

The device 400 may perform one or more processes described herein. For example, a non-transitory computer-readable medium (e.g., the memory 430 and/or the storage component 440) may store a set of instructions (e.g., one or more instructions, code, software code, and/or program code) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
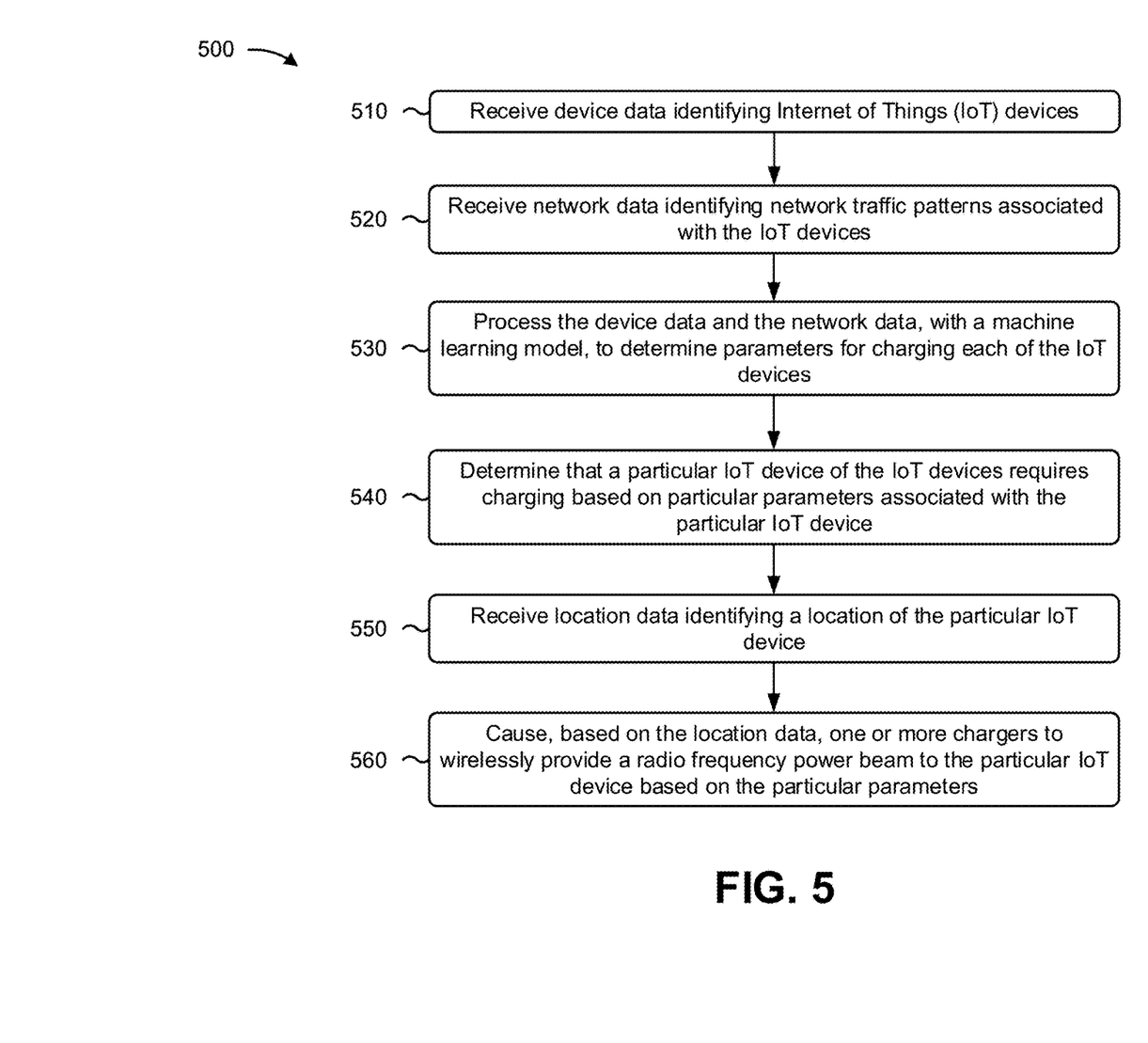
FIG. 5 is a flowchart of an example process for wirelessly charging IoT devices.

FIG. 5 is a flowchart of an example process 500 for wirelessly charging IoT devices 110. In some implementations, one or more process blocks of FIG. 5 may be performed by a device (e.g., base station 105 and/or RAN controller 115). In some implementations, one or more process blocks of FIG. 5 may be performed by another device or a group of devices separate from or including the device, such as an IoT device (e.g., IoT device 110) and/or a device of core network 310. Additionally, or alternatively, one or more process blocks of FIG. 5 may be performed by one or more components of the device 400, such as the processor 420, the memory 430, the storage component 440, the input component 450, the output component 460, and/or the communication component 470.

As shown in FIG. 5, process 500 may include receiving device data identifying Internet of Things (IoT) devices (block 510). For example, the device may receive device data identifying Internet of Things (IoT) devices, as described above. In some implementations, the device data identifies charging thresholds for one or more of the IoT devices and charging cycles for the IoT devices. In some implementations, the network data identifies one or more base stations associated with each of the IoT devices and locations of the IoT devices.

As further shown in FIG. 5, process 500 may include receiving network data identifying network traffic patterns associated with the IoT devices (block 520). For example, the device may receive network data identifying network traffic patterns associated with the IoT devices, as described above.

As further shown in FIG. 5, process 500 may include processing the device data and the network data, with a machine learning model, to determine parameters for charging each of the IoT devices (block 530). For example, the device may process the device data and the network data, with a machine learning model, to determine parameters for charging each of the IoT devices, as described above.

As further shown in FIG. 5, process 500 may include determining that a particular IoT device of the IoT devices requires charging based on particular parameters associated with the particular IoT device (block 540). For example, the device may determine that a particular IoT device of the IoT devices requires charging based on particular parameters associated with the particular IoT device, as described above. In some implementations, the particular parameters indicate that a charging level of the particular IoT device fails to satisfy a threshold level.

As further shown in FIG. 5, process 500 may include receiving location data identifying a location of the particular IoT device (block 550). For example, the device may receive location data identifying a location of the particular IoT device, as described above.

As further shown in FIG. 5, process 500 may include causing, based on the location data, one or more chargers to wirelessly provide a radio frequency power beam to the particular IoT device based on the particular parameters (block 560). For example, the device may cause, based on the location data, one or more chargers to wirelessly provide a radio frequency power beam to the particular IoT device based on the particular parameters, as described above. In some implementations, causing the one or more chargers to wirelessly provide the radio frequency power beam to the particular IoT device based on the particular parameters includes causing the one or more chargers to wirelessly provide the radio frequency power beam, with a particular radio strength and a particular spectrum, to the particular IoT device.

Process 500 may include additional implementations, such as any single implementation or any combination of implementations described below and/or in connection with one or more other processes described elsewhere herein.

In some implementations, process 500 includes authenticating the particular IoT device to receive the power based on the particular parameters.

In some implementations, process 500 includes receiving, from the one or more chargers, power data identifying a quantity of time spent charging the particular IoT device, calculating a charge for an account associated with the particular IoT device based on the power data, and debiting the account associated with the particular IoT device for payment.

In some implementations, process 500 includes receiving firmware data identifying a firmware update to be provided to the particular IoT device, determining that the firmware data satisfies the particular parameters associated with the particular IoT device, and causing one or more of the base stations to provide the firmware update to the particular IoT device based on the particular parameters.

In some implementations, process 500 includes receiving an indication that a charging level of the particular IoT device satisfies a threshold level and causing the one or more chargers to cease providing the radio frequency power beam to the particular IoT device based on the indication.

In some implementations, process 500 includes causing multiple chargers to wirelessly provide the radio frequency power beam to the particular IoT device based on the parameters; causing the one or more chargers to wirelessly provide the radio frequency power beam to the particular IoT device based on a request from the particular IoT device and based on the parameters; or causing one or more base stations to deliver a firmware update to the particular IoT device based on the parameters.

In some implementations, process 500 includes causing the one or more chargers to wirelessly provide the radio frequency power beam to the particular IoT device based on a charging cycle or a time cycle included in the parameters, or retraining the machine learning model based on the parameters.

In some implementations, process 500 includes identifying multiple chargers when the particular IoT device is physically moving and causing the multiple chargers to wirelessly provide the radio frequency power beam to the particular IoT device.

In some implementations, process 500 includes receiving feedback associated with the parameters, and retraining the machine learning model based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a radio access network (RAN) controller of a RAN, device data identifying Internet of Things (IoT) devices;
   receiving, by the RAN controller, network data identifying network traffic patterns associated with the IoT devices;
   processing, by the RAN controller, the device data and the network data, with a machine learning model, to determine parameters for charging each of the IoT devices;
   determining, by the RAN controller, that a particular IoT device of the IoT devices requires charging based on particular parameters associated with the particular IoT device;
   authenticating, by the RAN controller, the particular IoT device to receive power based on the particular parameters;
   receiving, by the RAN controller, location data identifying a location of the particular IoT device;
   identifying, by the RAN controller and based on the location data, one or more base stations, of the RAN, that are closest to the location of the particular IoT device to ensure that the particular IoT device is capable of receiving a radio frequency power beam from the one or more base stations; and
   providing, by the RAN controller, a command to the one or more base stations to wirelessly provide the radio frequency power beam to the particular IoT device based on the particular parameters.

2. The method of claim 1, wherein the device data identifies charging thresholds for one or more of the IoT devices and charging cycles for the IoT devices.

3. The method of claim 1, further comprising:
   receiving, from the one or more base stations, power data identifying a quantity of time spent charging the particular IoT device;
   calculating a charge for an account associated with the particular IoT device based on the power data; and
   debiting the account associated with the particular IoT device for payment.

4. The method of claim 1, further comprising:
   receiving firmware data identifying a firmware update to be provided to the particular IoT device;
   determining that the firmware data satisfies the particular parameters associated with the particular IoT device; and
   causing the one or more base stations to provide the firmware update to the particular IoT device based on the particular parameters.

5. The method of claim 1, wherein the particular parameters indicate that a charging level of the particular IoT device fails to satisfy a threshold level.

6. A radio access network (RAN) controller of a RAN, comprising:
   one or more processors configured to:
      receive device data identifying Internet of Things (IoT) devices;
      receive network data identifying network traffic patterns associated with the IoT devices;
      process the device data and the network data, with a machine learning model, to determine parameters for charging each of the IoT devices;
      determine that a particular IoT device of the IoT devices requires charging based on particular parameters associated with the particular IoT device;
      authenticate the particular IoT device to receive power based on the particular parameters;
      receive location data identifying a location of the particular IoT device;
      identify, based on the location data, one or more base stations, of the RAN, that are closest to the location of the particular IoT device to ensure that the particular IoT device is capable of receiving a radio frequency power beam from the one or more base stations; and
      cause, based on providing a command, the one or more base stations to wirelessly provide the radio frequency power beam to the particular IoT device based on the particular parameters.

7. The RAN controller of claim 6, wherein the one or more processors are further configured to:
   receive an indication that a charging level of the particular IoT device satisfies a threshold level; and
   cause the one or more base stations to cease providing the radio frequency power beam to the particular IoT device based on the indication.

8. The RAN controller of claim 6, wherein the one or more processors are further configured to:
   cause the one or more base stations to deliver a firmware update to the particular IoT device based on the particular parameters.

9. The RAN controller of claim 6, wherein the one or more processors are further configured to one or more of:
   cause the one or more base stations to wirelessly provide the radio frequency power beam to the particular IoT device based on a charging cycle or a time cycle included in the particular parameters; or
   retrain the machine learning model based on the parameters.

10. The RAN controller of claim 6, wherein the one or more processors are further configured to:
    identify multiple base stations when the particular IoT device is physically moving; and
    cause the multiple base stations to wirelessly provide the radio frequency power beam to the particular IoT device.

11. The RAN controller of claim 6, wherein the one or more processors are further configured to:
    receive feedback associated with the parameters; and
    retrain the machine learning model based on the feedback.

12. The RAN controller of claim 6, wherein the one or more processors, to cause the one or more base stations to wirelessly provide the radio frequency power beam to the particular IoT device based on the particular parameters, are configured to:

cause the one or more base stations to wirelessly provide the radio frequency power beam, with a particular radio strength and a particular spectrum, to the particular IoT device.

13. A non-transitory computer-readable medium storing a set of instructions, the set of instructions comprising:

one or more instructions that, when executed by one or more processors of a radio access network (RAN) controller of a RAN, cause the RAN controller to:
receive device data identifying Internet of Things (IoT) devices;
receive network data identifying network traffic patterns associated with the IoT devices;
process the device data and the network data, with a machine learning model, to determine parameters for charging each of the IoT devices;
determine that a particular IoT device of the IoT devices requires charging based on particular parameters associated with the particular IoT device;
authenticate the particular IoT device to receive power based on the particular parameters;
receive location data identifying a location of the particular IoT device;
identify, based on the location data, one or more base stations, of the RAN, that are closest to the location of the particular IoT device to ensure that the particular IoT device is capable of receiving a radio frequency power beam from the one or more base stations;
cause the one or more base stations to wirelessly provide the radio frequency power beam to the particular IoT device based on the particular parameters;
receive an indication that a charging level of the particular IoT device satisfies a threshold level; and
cause the one or more base stations to cease providing the radio frequency power beam to the particular IoT device based on the indication.

14. The non-transitory computer-readable medium of claim 13, wherein the one or more instructions further cause the RAN controller to:

receive, from the one or more base stations, power data identifying a quantity of time spent charging the particular IoT device;
calculate a charge for an account associated with the particular IoT device based on the power data; and
debit the account associated with the particular IoT device for payment.

15. The non-transitory computer-readable medium of claim 13, wherein the one or more instructions further cause the RAN controller to:

receive firmware data identifying a firmware update to be provided to the particular IoT device;
determine that the firmware data satisfies the particular parameters associated with the particular IoT device; and
cause the one or more base stations to provide the firmware update to the particular IoT device based on the particular parameters.

16. The non-transitory computer-readable medium of claim 13, wherein the one or more instructions further cause the RAN controller to:

cause the one or more base stations to deliver a firmware update to the particular IoT device based on the particular parameters.

17. The non-transitory computer-readable medium of claim 13, wherein the one or more instructions further cause the RAN controller to one or more of:

cause the one or more base stations to wirelessly provide the radio frequency power beam to the particular IoT device based on a charging cycle or a time cycle included in the particular parameters; or
retrain the machine learning model based on the parameters.

18. The non-transitory computer-readable medium of claim 13, wherein the one or more instructions further cause the RAN controller to:

identify multiple base stations when the particular IoT device is physically moving; and
cause the multiple base stations to wirelessly provide the radio frequency power beam to the particular IoT device.

19. The method of claim 1, wherein device data includes data identifying at least one of:

types of the IoT devices,
serial numbers of the IoT devices,
network addresses of the IoT devices, or
manufacturers of the IoT devices.

20. The method of claim 1, wherein the network data includes data identifying at least one of:

bandwidth of base stations utilized by the IoT devices, wherein the base stations include the one or more base stations, time periods associated with transmission or reception of traffic by the IoT devices, or
radio frequency spectrums associated with transmission or reception of the traffic by the IoT devices.

* * * * *